(12) United States Patent
Shirane

(10) Patent No.: US 12,025,493 B2
(45) Date of Patent: Jul. 2, 2024

(54) COLOR MEASURING APPARATUS

(71) Applicant: SEIKO EPSON CORPORATION, Tokyo (JP)

(72) Inventor: Tatsuya Shirane, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/658,895

(22) Filed: Apr. 12, 2022

(65) Prior Publication Data

US 2022/0326077 A1 Oct. 13, 2022

(30) Foreign Application Priority Data

Apr. 13, 2021 (JP) ................................. 2021-067566

(51) Int. Cl.
- *G01J 3/02* (2006.01)
- *G01J 3/50* (2006.01)
- *G01J 3/51* (2006.01)
- *G01J 3/26* (2006.01)
- *G01J 3/32* (2006.01)

(52) U.S. Cl.
CPC ........... *G01J 3/0202* (2013.01); *G01J 3/0272* (2013.01); *G01J 3/0291* (2013.01); *G01J 3/50* (2013.01); *G01J 3/26* (2013.01); *G01J 3/32* (2013.01); *G01J 3/51* (2013.01)

(58) Field of Classification Search
CPC .......... G01J 3/0202; G01J 3/0291; G01J 3/50; G01J 3/26; G01J 3/32; G01J 2003/1247; G01J 3/0272; G01J 3/51
USPC ........................................................ 356/402
See application file for complete search history.

(56) References Cited

U.S. PATENT DOCUMENTS

| | | | | | |
|---|---|---|---|---|---|
| 5,168,320 | A | * | 12/1992 | Lutz | G01J 3/524 356/402 |
| 5,684,582 | A | * | 11/1997 | Eastman | G01J 3/0283 356/334 |
| 6,325,556 | B1 | * | 12/2001 | Yoon | G03B 17/561 396/419 |
| 2003/0071998 | A1 | * | 4/2003 | Krupka | G01J 3/50 356/402 |
| 2005/0242191 | A1 | * | 11/2005 | Baker | G01J 3/0272 235/472.01 |

(Continued)

FOREIGN PATENT DOCUMENTS

| | | |
|---|---|---|
| JP | 2006056210 A | 3/2006 |
| JP | 2010067730 A | 3/2010 |

*Primary Examiner* — Michelle M Iacoletti
*Assistant Examiner* — Noah J. Haney
(74) *Attorney, Agent, or Firm* — CHIP LAW GROUP

(57) ABSTRACT

A color measuring apparatus includes an opening portion that is provided in a bottom portion of the apparatus and takes light from a measurement target into the apparatus, an incident light processing unit that processes light that enters the apparatus through the opening portion, a housing that covers an apparatus internal unit including the incident light processing unit, at least one protrusion member that is configured to switch between a first state in which the protrusion member protrudes from a bottom surface of the housing and a second state in which the protrusion member does not protrude from the bottom surface of the housing, and at least one pressing member that presses the protrusion member in a protruding direction from the bottom surface of the housing.

10 Claims, 7 Drawing Sheets

(56) References Cited

U.S. PATENT DOCUMENTS

| | | | | |
|---|---|---|---|---|
| 2008/0013077 A1* | 1/2008 | Orelli | ............... | G01J 3/02 |
| | | | | 356/402 |
| 2010/0328656 A1* | 12/2010 | Frick | ............... | G01J 3/501 |
| | | | | 356/247 |
| 2011/0253570 A1* | 10/2011 | Horiuchi | ............... | G03B 42/025 |
| | | | | 206/320 |
| 2014/0125974 A1* | 5/2014 | Hoult | ............... | G01J 3/02 |
| | | | | 248/688 |
| 2014/0192358 A1* | 7/2014 | Barbieri | ............... | G01J 3/0256 |
| | | | | 356/402 |
| 2014/0218735 A1* | 8/2014 | Tatsuda | ............... | G01J 3/0283 |
| | | | | 356/416 |
| 2016/0205287 A1* | 7/2016 | Obara | ............... | H04N 1/6044 |
| | | | | 356/402 |
| 2019/0154508 A1* | 5/2019 | Aomatsu | ............... | G01N 21/251 |

\* cited by examiner

COLOR MEASURING APPARATUS

The present application is based on, and claims priority from JP Application Serial Number 2021-067566, filed Apr. 13, 2021, the disclosure of which is hereby incorporated by reference herein in its entirety.

BACKGROUND

1. Technical Field

The present disclosure relates to a color measuring apparatus that performs color measurement based on light from a measurement target.

2. Related Art

In some cases, an electronic apparatus adopts a buffering structure that buffers an impact as described in JP-A-2010-67730. The buffering structure described in JP-A-2010-67730 is provided with a buffering member on an outer side of the housing. The buffering member is provided so as to cover a part of a side surface of the housing.

One example of the electronic device is a color measuring apparatus. In some cases, the color measuring apparatus is provided with an opening portion in the bottom portion of the housing, takes light from a measurement target into the apparatus through the opening portion, and performs measurement by a measurement unit inside the apparatus. In such a color measuring apparatus, when the distance between the bottom surface of the housing and the measurement unit is unstable, the measurement accuracy may be lowered. Moreover, when there is a gap between the bottom surface of the housing and the measurement target, light from outside enters the apparatus, as a result of which the measurement accuracy may be lowered. Therefore, a structure in which a buffering member is provided on a side surface of the housing as described in JP-A-2010-67730 cannot solve the above-mentioned problem.

SUMMARY

The present disclosure is a color measuring apparatus including an opening portion that is provided in a bottom portion of the apparatus and takes light from a measurement target into the apparatus, an incident light processing unit that processes light that enters the apparatus through the opening portion, a housing that covers an apparatus internal unit including the incident light processing unit, at least one protrusion member that is configured to switch between a first state in which the protrusion member protrudes from a bottom surface of the housing and a second state in which the protrusion member does not protrude from the bottom surface of the housing, and at least one pressing member that presses the protrusion member in a protruding direction from the bottom surface of the housing.

DESCRIPTION OF EXEMPLARY EMBODIMENTS

Figure 1:
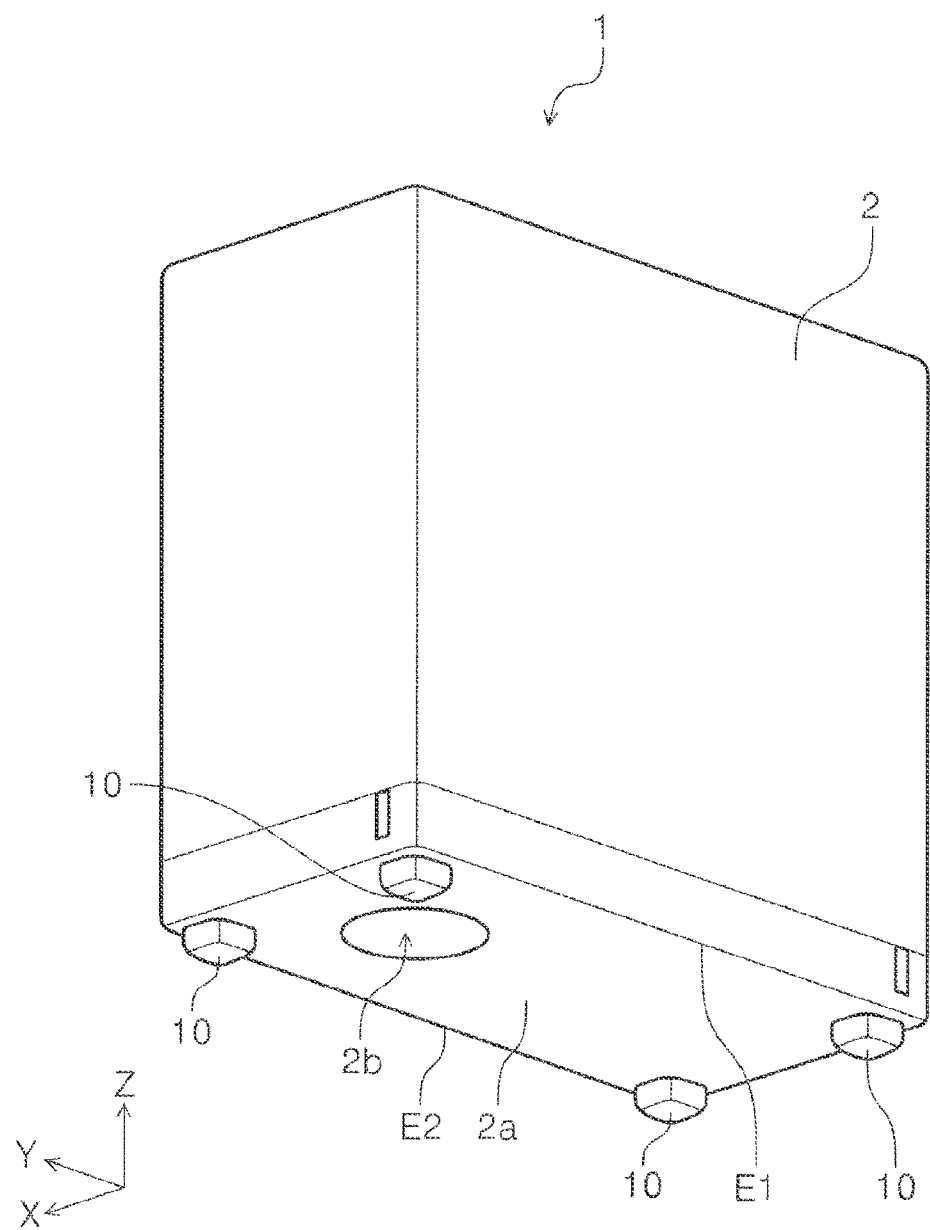
FIG. 1 is a perspective view of a color measuring apparatus viewed from below.

Hereinafter, the present disclosure will be schematically described. A color measuring apparatus according the first aspect includes an opening portion that is provided in a bottom portion of the apparatus and takes light from a measurement target into the apparatus, an incident light processing unit that processes light that enters the apparatus through the opening portion, a housing that covers an apparatus internal unit including the incident light processing unit, at least one protrusion member that is configured to switch between a first state in which the protrusion member protrudes from a bottom surface of the housing and a second state in which the protrusion member does not protrude from the bottom surface of the housing, and at least one pressing member that presses the protrusion member in a protruding direction from the bottom surface of the housing.

According to this aspect, since the color measuring apparatus includes at least one protrusion member that is configured to switch between the first state in which the protruding member protrudes from the bottom surface of the housing and the second state in which the protrusion member does not protrude from the bottom surface of the housing, and at least one pressing member that presses the protrusion member in the protruding direction from the bottom surface of the housing, by a buffering structure with the protrusion member and the pressing member, an impact when the apparatus is dropped with the bottom surface facing down can be mitigated. In addition, since the protrusion member is configured to switch the first state in which the protrusion member protrudes from the bottom surface and the second state in which the protrusion member does not protrude from the bottom surface of the housing, in the second state, a gap is suppressed from being formed between the bottom surface and the measurement target, as a result of which an appropriate measurement result can be obtained.

The second aspect is the color measuring apparatus according to the first aspect, in which the protrusion members are provided at four corners of the bottom surface. According to this aspect, since the protrusion members are provided at the four corners of the bottom surface, an appropriate impact buffering effect can be obtained when the apparatus is dropped with the bottom surface facing down. In addition, when the apparatus is mounted on the mounting surface with the bottom surface facing down, the orientation of the apparatus is stabilized.

The third aspect is the color measuring apparatus according to the first or the second aspect, in which the protrusion member includes a main body portion, an arm portion extending in an apparatus inside direction from the main body portion, and a hook provided at a tip of the arm portion, and as the hook is hooked on a regulating portion provided in the housing, a protrusion amount of the protrusion member from the bottom surface is regulated. According to this aspect, as the hook is hooked on the regulating portion provided in the housing, the protrusion amount of the protrusion member from the bottom surface is regulated. As a result, the first state of the protrusion member can be formed by a simple structure.

The fourth aspect is the color measuring apparatus according to the third aspect, in which, in the first state of the protrusion member, the arm portion protrudes from the bottom surface and is configured to be elastically deformed in a direction intersecting with a displacement direction of the protrusion member.

According to this aspect, since, in the first state of the protrusion member, the arm portion protrudes from the bottom surface and is configured to be elastically deformed in a direction intersecting with the displacement direction of the protrusion member, when the apparatus falls while being inclined, an impact at the moment when a force in the direction intersecting with the displacement direction is applied to the protrusion member can be mitigated.

The fifth aspect is the color measuring apparatus according to any one of the first to the fourth aspects, in which the protrusion member is provided with a roller configured to perform driven rotation at a position in contact with the measurement target. According to this aspect, since the protrusion member is provided with a roller configured to perform driven rotation at a position in contact with the measurement target, when measurement is performed while the apparatus slides with respect to the measurement target, the apparatus can slide with a small force.

The sixth aspect is the color measuring apparatus according to any one of the first to the fourth aspects, in which, a friction coefficient between the part of the protrusion member that contacts the measurement target and the measurement target is higher than a friction coefficient between the bottom surface and the measurement target. According to this aspect, since the friction coefficient between the part of the protrusion member that contacts the measurement target and the measurement target is higher than the friction coefficient between the bottom surface and the measurement target, when measurement is performed while the position of the apparatus with respect to the measurement target is fixed, displacement between the measurement target and the apparatus can be suppressed.

Hereinafter, the present disclosure will be specifically described. Note that the X-Y-Z coordinate system illustrated in each figure is an orthogonal coordinate system, the X-Y plane is a horizontal plane, and the Y-Z plane and the X-Z plane are vertical planes. The Z-axis direction is the vertical direction and is a direction intersecting with an upper surface 2g and a bottom surface 2a of the color measuring apparatus 1. In addition, the Z-axis direction is a direction parallel to an optical axis CL described later. In addition, the Y-axis direction is a longitudinal direction of the color measuring apparatus 1 when the apparatus is viewed from the Z-axis direction, and the X-axis direction is a latitudinal direction of the color measuring apparatus 1 when the apparatus is viewed from the Z-axis direction. In the specification, the configuration of the color measuring apparatus 1 will be described assuming that the apparatus is mounted on a measurement target G or a mounting surface forming a surface parallel to the horizontal plane, and the longitudinal direction of the color measuring apparatus 1 extends in the Y-axis direction.

Figure 2:
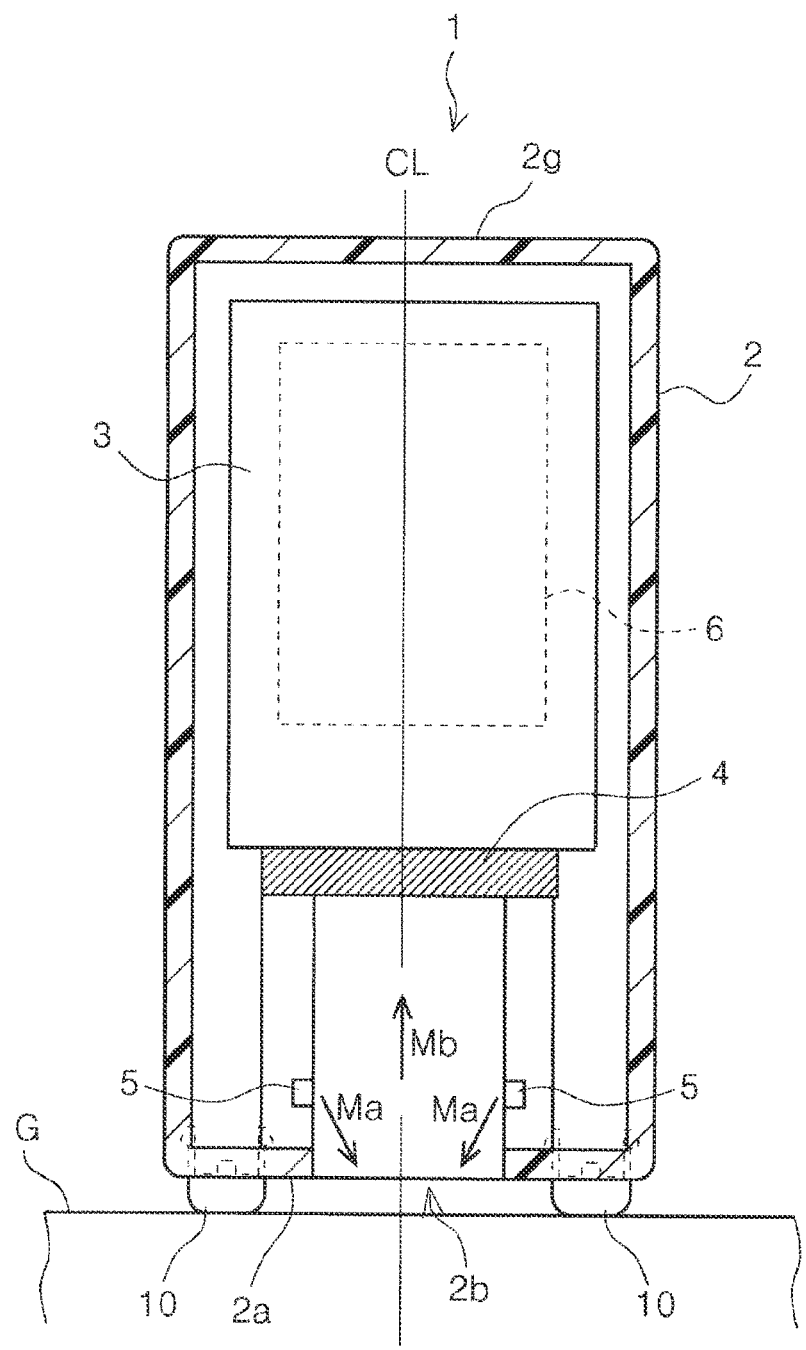
FIG. 2 is a cross sectional view of the color measuring apparatus cut along an X-Z plane at a central position of an opening portion and illustrates a protrusion state of a protrusion member.

The color measuring apparatus 1 in FIGS. 1 and 2 has a configuration for performing color measurement based on light Mb from the measurement target G. Examples of the light Mb from the measurement target G include light reflected by the measurement target G and light emitted by the measurement target G. Note that the actual measurement state is the state in FIG. 5 in which a protrusion member 10 does not protrude from the bottom surface 2a, but here, the configuration of the color measuring apparatus 1 will be described with reference to FIGS. 1 and 2.

The color measuring apparatus 1 includes an apparatus internal unit 3 inside a housing 2 that constitutes an outer shell of the apparatus. In other words, the apparatus internal unit 3 is covered with the housing 2. The housing 2 is formed with a resin material in the present embodiment. The apparatus internal unit 3 includes an incident light processing unit 4 that processes the light Mb that has entered the apparatus. A detailed description of the incident light processing unit 4 will be omitted, but the incident light processing unit 4 includes an optical filter (not illustrated) in the present embodiment.

The optical filter selectively transmits an appropriate wavelength component from the light Mb that has entered the apparatus. The light that has passed through the optical filter enters a light receiving element (not illustrated), specifically a photodiode. Then, the intensity of the incident light is converted into a voltage value and is output to a control unit (not illustrated). The color measuring apparatus 1 measures a spectrum of the measurement target G by repeating wavelength selection by the above-mentioned optical filter and acquisition of received light intensity. In the present embodiment, the optical filter is a wavelength variable Fabry-Perot etalon and is a wavelength filter using multiple interaction of two reflection surfaces facing each other. Needless to say, the configuration of the incident light processing unit 4 is not limited to a configuration including an optical filter as described above.

The wavelength variable Fabry-Perot etalon is configured to select a wavelength by controlling an interval in the Z-axis direction of a pair of mirrors (not illustrated) disposed to face each other at an interval in the Z-axis direction. Accordingly, the color measuring apparatus 1 is vulnerable to an impact in the Z-axis direction. In other words, the color measuring apparatus 1 is configured to be relatively robust over an impact not including a Z-axis direction element.

An opening portion 2b is formed in the bottom portion of the apparatus, and the light Mb toward the incident light processing unit 4 from the measurement target G is taken into the apparatus through the opening portion 2b. The opening portion 2b is an opening portion having a perfect circular shape with the optical axis CL as a center. The optical axis CL is an optical axis of the light Mb toward the incident light processing unit 4 from the measurement target G.

The apparatus internal unit 3 includes a light emitting unit 5 inside the opening portion 2b. Light Ma emitted from the light emitting unit 5 travels toward the outside of the apparatus through the opening portion 2b and irradiates the measurement target G facing the bottom surface 2a. In addition, the apparatus internal unit 3 includes a battery 6, which is a power supply source of the apparatus, and power is supplied to the incident light processing unit 4, the light emitting unit 5, and the like from the battery 6 via a voltage adjustment circuit.

Next, in the bottom portion of the housing 2, the protrusion member 10 protruding in the −Z-axis direction from the bottom surface 2a is provided. As illustrated in FIG. 1, in the present embodiment, the protrusion members 10 are provided at the four corners of the bottom surface 2a, and the opening portion 2b is disposed on the inner side of the four protrusion members 10.

Each of the protrusion members 10 is formed such that the corner portions of the surface in the −Z-axis direction are R faces and formed into a rounded shape. The protrusion member 10 is configured to switch between a first state in which the protrusion member 10 protrudes from the bottom surface 2a (see FIGS. 2 and 3) and a second state in which the protrusion member 10 does not protrude from the bottom surface 2a (see FIGS. 4 and 5). Note that in the specification, the first state may be referred to as a protrusion state, and the second state may be referred to as a non-protrusion state.

Figure 3:
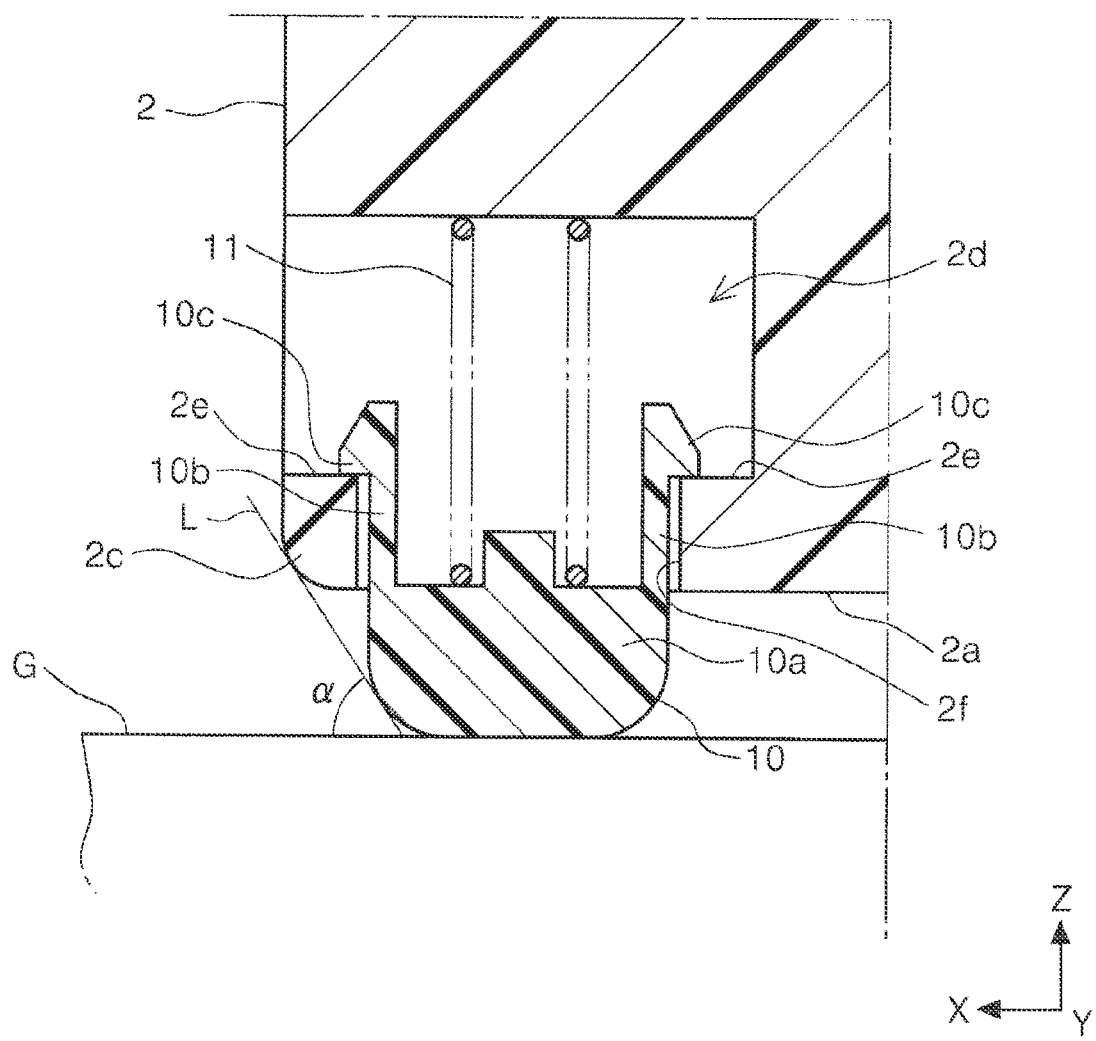
FIG. 3 is a cross sectional view of an arrangement portion of the protrusion member cut along the X-Z plane and illustrates the protrusion state of the protrusion member.

As illustrated in FIG. 3, a guide hole 2f is formed so as to be open in the bottom portion of the housing 2, and an accommodating portion 2d is formed inside the guide hole 2f. The protrusion member 10 is provided by being inserted into the accommodating portion 2d from the guide hole 2f.

The protrusion member 10 is formed of a resin material so as to include a main body portion 10a constituting a solid structure, and an arm portion 10b extending in the +Z-axis direction from the main body portion 10a, that is, the apparatus inside direction. The arm portions 10b are formed so as to extend in the +Z-axis direction from an end portion in the +X-direction and an end portion in the −X-axis direction of the main body portion 10a. A hook 10c is formed at the tip of each of the arm portions 10b in the +Z-axis direction. A regulating portion 2e is formed in the accommodating portion 2d. The hook 10c is hooked on the regulating portion 2e, as a result of which the protrusion amount of the protrusion member 10 from the bottom surface 2a is regulated. Moreover, in the accommodating portion 2d, a compression coil spring 11 as a pressing member that presses the protrusion member 10 in the −Z-axis direction, that is, in the protruding direction from the bottom surface 2a is accommodated.

When the color measuring apparatus 1 is mounted on the measurement target G and the user does not apply an external force to the color measuring apparatus 1, the protrusion member 10 maintains the first state illustrated in FIGS. 2 and 3, that is, the protrusion state. In this way, the spring force of the compression coil spring 11 is set so as to be able to maintain the protrusion state even when the own weight of the color measuring apparatus 1 is applied.

Figure 4:
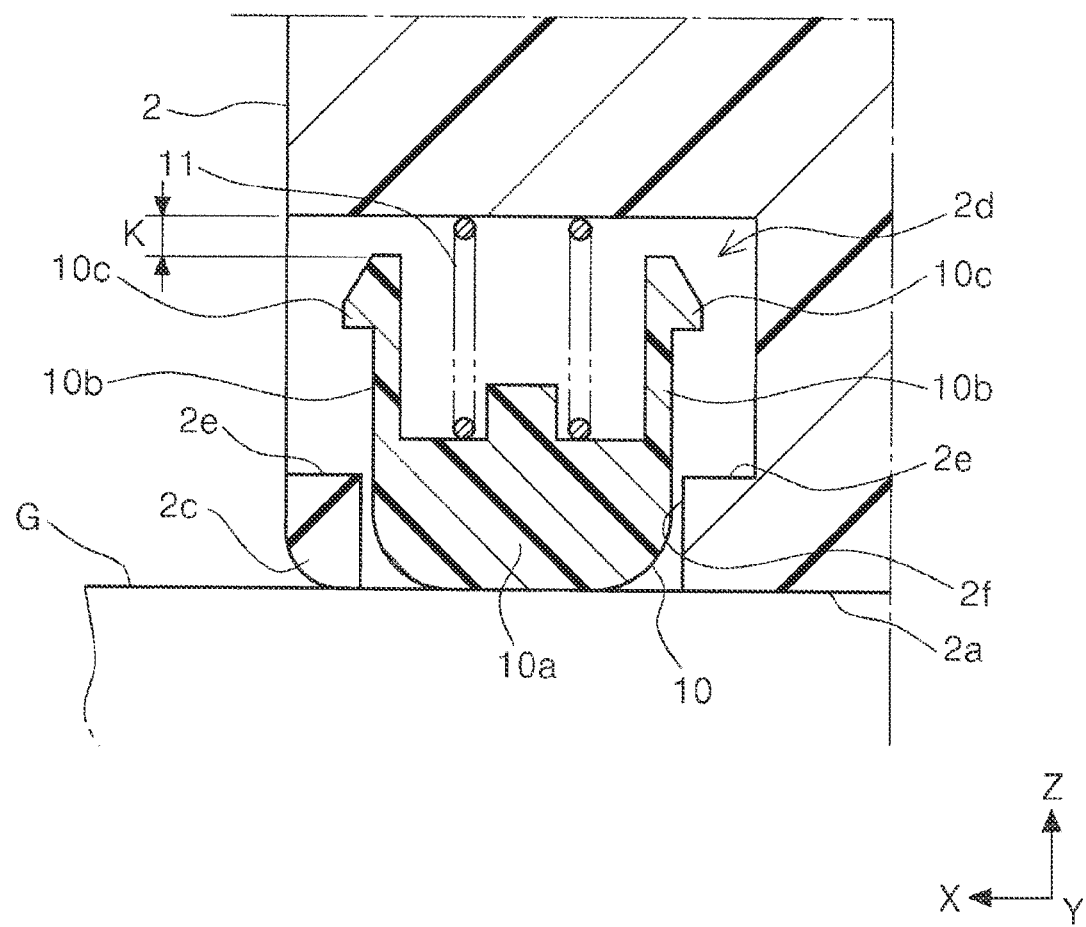
FIG. 4 is a cross sectional view of the arrangement portion of the protrusion member cut along the X-Z plane and illustrates a non-protrusion state of the protrusion member.
Figure 5:
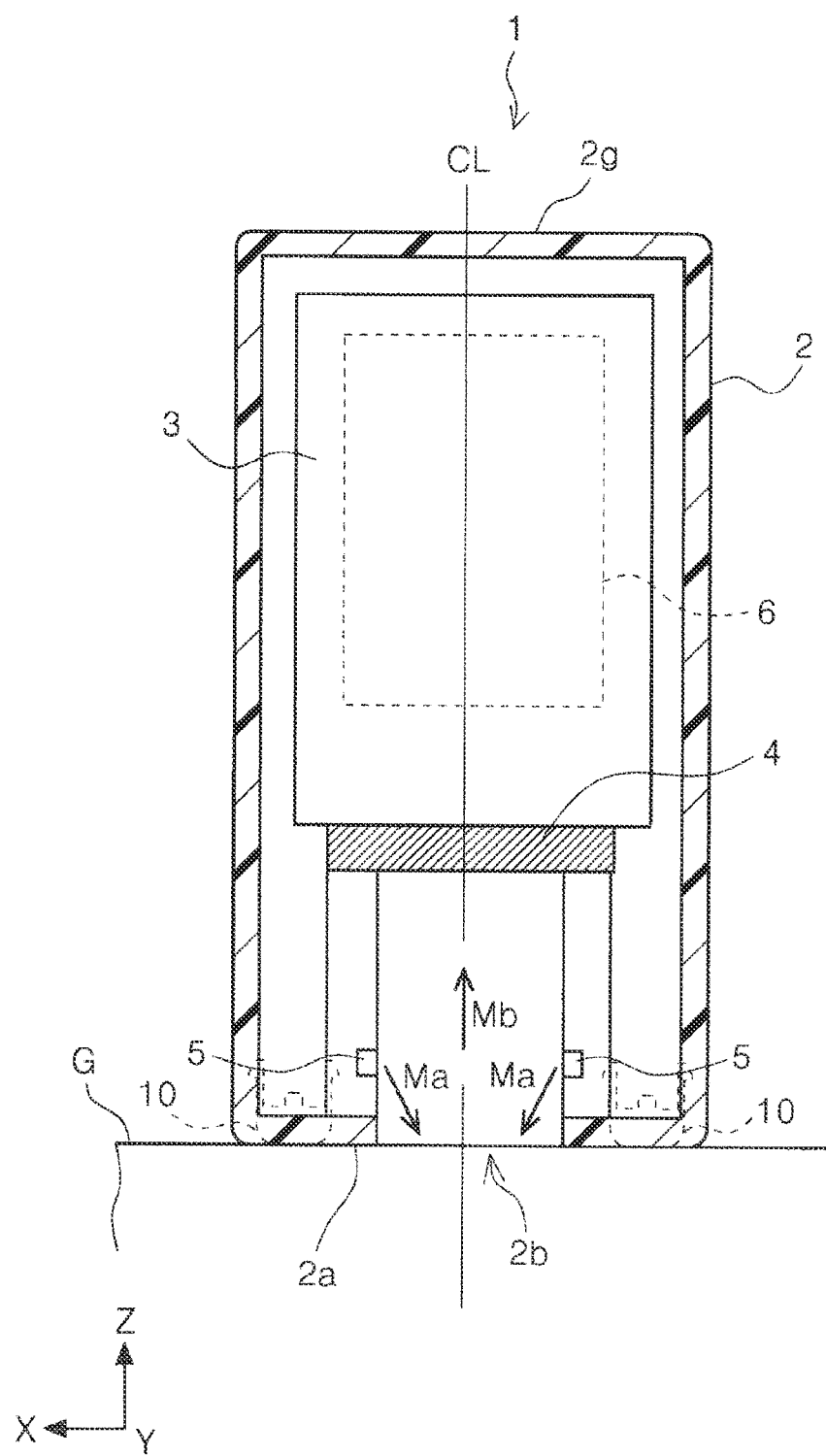
FIG. 5 is a cross sectional view of the color measuring apparatus cut along the X-Z plane at a central position of the opening portion and illustrates the non-protrusion state of the protrusion member.

When measurement is performed, the user applies a force to the color measuring apparatus 1 as if the user pressed the color measuring apparatus 1 against the measurement target G. As a result, the protrusion member 10 enters the accommodating portion 2d as illustrated by the change from FIG. 3 to FIG. 4 and switches to the second state, that is, the non-protrusion state. As a result, as illustrated in FIGS. 4 and 5, the interval between the bottom surface 2a and the measurement target G is eliminated, and light from outside is suppressed from entering the apparatus from the opening portion 2b. Note that, in the state of FIG. 4, a gap K is formed between the upper end portion of the arm portion 10b and the upper wall portion of the accommodating portion 2d so that the protrusion member 10 does not protrude from the bottom surface 2a in the second state.

Since the protrusion member 10 is pressed by the compression coil spring 11 in the protruding direction from the bottom surface 2a, even when the color measuring apparatus 1 is dropped to the measurement target G or the mounting surface of the apparatus from a predetermined height, an impact added to the color measuring apparatus 1 is mitigated by the impact buffering structure with the protrusion member 10 protruding from the bottom surface 2a and the compression coil spring 11. In particular, since an impact in the Z-axis direction is mitigated, an adverse effect on the optical filter included in the incident light processing unit 4 can be suppressed, and the color measurement accuracy can be suppressed from lowering.

In the present embodiment, the spring force of the compression coil spring 11 is set to large enough to buffer an impact when the color measuring apparatus 1 is dropped to a dropped surface such as the measurement target G from a predetermined height. The predetermined height may be set within a range of 1 cm to 5 cm, for example. In this case, when the user unintentionally drops the color measuring apparatus 1 during measurement, the apparatus can be protected from the impact. Alternatively, the predetermined height may be set within a range of 80 cm to 100 cm, for example. In this case, when the user unintentionally drops the color measuring apparatus 1 while carrying the apparatus, the apparatus can be protected from the impact. Note that the predetermined height is, for example, a distance from the dropped surface such as the measurement target G to the lowermost end of the protrusion member 10.

Note that setting of the spring force of the compression coil spring 11 differs when it is assumed that impact buffering is attempted using all of a plurality of the protrusion members 10 and when it is assumed that impact buffering is attempted using some of the plurality of protrusion members 10. For example, in the present embodiment, the setting differs when impact buffering is attempted using all of the four protrusion members 10, when impact buffering is attempted using two of the four protrusion members 10, or when impact buffering is attempted using only one protrusion member 10. When impact buffering is attempted using two protrusion members 10 or only one protrusion member 10, even in a case where the apparatus is dropped while being inclined with respect to the dropped surface, a case where the dropped surface is uneven, or the like, an appropriate impact buffing function can be exhibited.

Note that the protrusion member 10 is preferably arranged at a position as close as possible to an edge of the bottom surface 2a, or is preferably arranged at a position as close as possible to a corner of the bottom surface 2a. With such a configuration, when the apparatus is dropped while being inclined with respect to the dropped surface, the protrusion member 10 collides with the dropped surface before the edge or the corner of the bottom surface 2a collides with the dropped surface, and the impact buffering function can be exhibited. In FIG. 3, a straight line L is a common tangent of the protrusion member 10 and a corner portion 2c, and an angle α represents an angle between the common tangent L and the measurement target G. The angle α is preferably equal to or more than 30°, or is preferably equal to or more than 45°. In the present embodiment, the angle α is set to approximately 60°. Note that, for example, when the apparatus falls while being inclined at 45° or more, considering that the apparatus will eventually fall down, it is also preferable to provide an elastic member on a side surface of the housing 2, as a result of which impact buffering is attempted.

As has been described thus far, the color measuring apparatus 1 includes the protrusion member 10 configured to switch between the first state in which the protrusion member 10 protrudes from the bottom surface 2a and the second state in which the protrusion member 10 does not protrude from the bottom surface 2a, and the compression coil spring 11 that is a pressing member for pressing the protrusion member 10 in the protruding direction from the bottom surface 2a. This means that, by the impact buffering structure with the protrusion member 10 and the compression coil spring 11, an impact when the apparatus is dropped with the bottom surface 2a facing down can be mitigated. In addition, since the protrusion member 10 is configured to switch between the first state in which the protrusion member 10 protrudes from the bottom surface 2a and the second state in which the protrusion member 10 does not protrude from the bottom surface 2a, a gap is suppressed from being formed between the bottom surface 2a and the measurement target G in the second state, and thus an appropriate measurement result can be obtained.

Note that in the present embodiment, four protrusion members 10 are provided, but the present disclosure is not limited thereto. The protrusion members 10 can be appropriately decreased or increased, and the minimum number is one. Moreover, in the present embodiment, although one compression coil spring 11 is provided for one protrusion member 10, a plurality of the compression coil springs 11 may be provided for one protrusion member 10, or one compression coil spring 11 may press a plurality of the protrusion members 10. In addition, the pressing member is not limited to a compression coil spring, and other springs such as a tensile coil spring and a plate spring, or an elastic material such as rubber or sponge may be used.

In addition, in the present embodiment, since the protrusion members 10 are provided at the four corners of the bottom surface 2a, an appropriate impact buffering effect can be exhibited when the apparatus is dropped with the bottom surface 2a facing down. In addition, when the apparatus is mounted on the mounting surface with the bottom surface 2a facing down, the orientation of the apparatus is stabilized.

In addition, each of the protrusion members 10 includes the main body portion 10a, the arm portion 10b extending in the apparatus inside direction from the main body portion 10a, and the hook 10c provided at the tip of the arm portion 10b. As the hook 10c is hooked on the regulating portion 2e, the protrusion amount of the protrusion member 10 from the bottom surface 2a in the first state can be regulated. With such a configuration, the first state of the protrusion member 10 can be formed with a simple structure.

Figure 6:
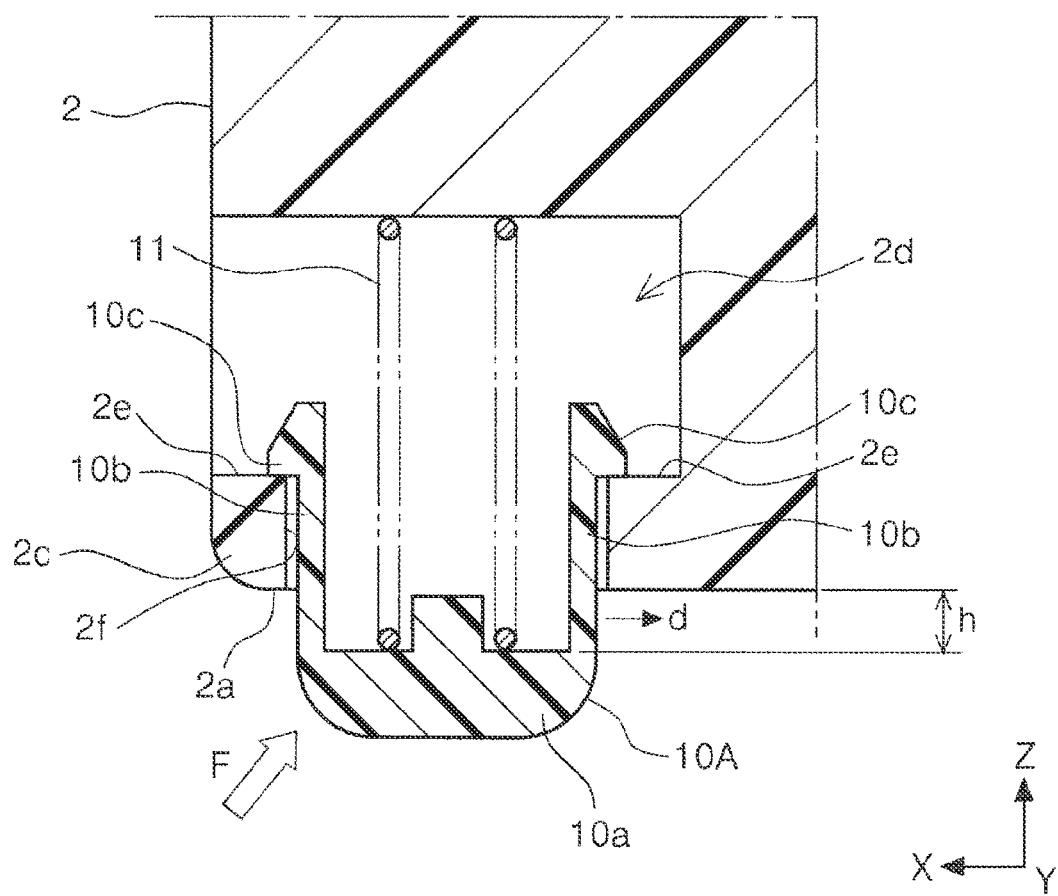
FIG. 6 is a cross sectional view of an arrangement portion of a protrusion member according to another embodiment cut along the X-Z plane and illustrates a protrusion state of the protrusion member.

Next, with reference to FIG. 6, a protrusion member 10A according to another embodiment will be described. Note that in the modifications that will be described below, the same constituents as the ones that have been already described are denoted by the same reference numerals, and redundant descriptions are omitted. In the protrusion member 10A, the arm portion 10b is formed longer than that of the protrusion member 10 according to the first embodiment described above, and the arm portion 10b protrudes in the −Z-axis direction from the bottom surface 2a in the first state. In other words, the main body portion 10a is at a position at a distance h from the bottom surface 2a in the −Z-axis direction. In addition, the arm portion 10b is configured to be elastically deformed in a direction intersecting with the displacement direction of the protrusion member 10A, that is, the Z-axis direction. As a result, when the apparatus falls while being inclined and a force F is applied to the protrusion member 10A in a direction intersecting with the displacement direction, the protrusion member 10A can be deformed in the direction indicated by an arrow d. As a result, the impact at the moment when the force F is applied to the protrusion member 10A can be mitigated.

Figure 7:
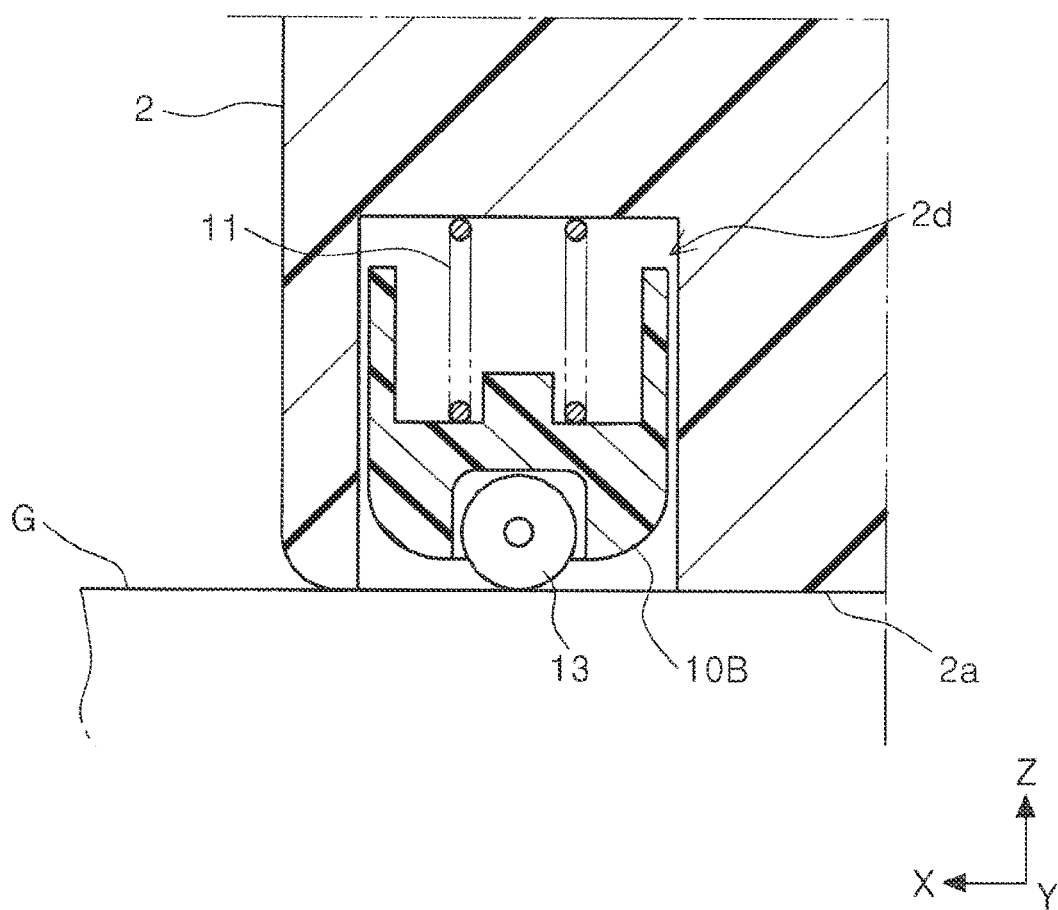
FIG. 7 is a cross sectional view of an arrangement portion of a protrusion member according to another embodiment cut along a Y-Z plane and illustrates a non-protrusion state of the protrusion member.

Next, with reference to FIG. 7, a protrusion member 10B according to another embodiment will be described. Note that, unlike FIGS. 2 to 6, FIG. 7 is a cross sectional view when the apparatus is cut along the Y-Z plane at the position of the protrusion member 10B. The protrusion member 10B is provided with a roller 13 configured to perform driven rotation at a position in contact with the measurement target G. As a result, when measurement is performed while the apparatus slides with respect to the measurement target G, the apparatus can slide with a small force.

Note that in the present embodiment, as illustrated in FIG. 1, in view of a case where measurement is performed while a ruler is applied to an edge E1 or an edge E2 in the Y-axis direction, and the apparatus slides in the Y-axis direction, the apparatus is configured such that the rotation axis center of the roller 13 is parallel to the X-axis direction. However, the present disclosure is not limited thereto. For example, for dealing with a case where measurement is performed while the apparatus slides in the X-axis direction, the apparatus may be configured such that the rotation axis center of the roller 13 is parallel to the Y-axis direction. In addition, instead of providing the roller 13, the apparatus may be configured such that the friction coefficient between a portion the part of the protrusion member that contacts the measurement target G and the measurement target G is lower than the friction coefficient between the bottom surface 2a and the measurement target G. As an example of such a configuration, it is considered that the housing 2 is formed of ABS resin and the protrusion member is formed of polyacetal (POM) resin. As a result, when the apparatus slides in either direction on the X-Y plane, the apparatus can slide smoothly.

On the contrary, the apparatus may be configured such that the friction coefficient between the part of the protrusion member that contacts the measurement target G and the measurement target G is higher than the friction coefficient between the bottom surface 2a and the measurement target G. As a result, when measurement is performed while the position of the apparatus is fixed with respect to the measurement target G, the apparatus can be suppressed from displacing from the measurement target G. As an example of such a configuration, it is considered that the housing 2 is formed of a resin material, and an elastic material such as rubber and cork is attached at the position of the protrusion member in contact with the measurement target G.

The present disclosure is not limited to the embodiments described above, various modifications can be made within the scope of the disclosure described in the scope of claims, and it is obvious that the modifications are also included in the scope of the disclosure.

What is claimed is:
1. A color measuring apparatus, comprising:
an opening portion that is provided in a bottom portion of the color measuring apparatus and takes light from a measurement target into the color measuring apparatus;
an incident light processing unit that processes the light that enters the color measuring apparatus through the opening portion;
a housing that covers an apparatus internal unit including the incident light processing unit;
a plurality of protrusion members provided at four corners of a bottom surface of the housing, wherein at least one protrusion member of the plurality of protrusion members is configured to switch between a first state in which the at least one protrusion member protrudes from the bottom surface of the housing and a second state in which the at least one protrusion member does not protrude from the bottom surface of the housing, wherein
in a case where a user presses the color measuring apparatus to the measurement target, the at least one protrusion member enters the housing, and switches to the second state,
the at least one protrusion member includes a main body portion, and
the main body portion contacts the measurement target in both the first state and the second state; and
at least one pressing member that presses the at least one protrusion member in a protruding direction from the bottom surface of the housing.

2. The color measuring apparatus according to claim 1, wherein
the at least one protrusion member further includes
an arm portion extending in an apparatus inside direction from the main body portion, and
a hook provided at a tip of the arm portion, and
as the hook is hooked on a regulating portion provided in the housing, a protrusion amount of the at least one protrusion member from the bottom surface is regulated.

3. The color measuring apparatus according to claim 2, wherein in the first state of the at least one protrusion member, the arm portion protrudes from the bottom surface and is configured to be elastically deformed in a direction intersecting with a displacement direction of the at least one protrusion member.

4. The color measuring apparatus according to claim 1, wherein the at least one protrusion member is provided with a roller configured to perform driven rotation at a position in contact with the measurement target.

5. The color measuring apparatus according to claim 1, wherein a friction coefficient between a part of the at least one protrusion member that contacts the measurement target and the measurement target is higher than a friction coefficient between the bottom surface and the measurement target.

6. A color measuring apparatus, comprising:
an opening portion that is provided in a bottom portion of the color measuring apparatus and takes light from a measurement target into the color measuring apparatus;
an incident light processing unit that processes the light that enters the color measuring apparatus through the opening portion;
a housing that covers an apparatus internal unit including the incident light processing unit;
at least one protrusion member that is configured to switch between a first state in which the at least one protrusion member protrudes from a bottom surface of the housing and a second state in which the at least one protrusion member does not protrude from the bottom surface of the housing, wherein
in a case where a user presses the color measuring apparatus to the measurement target, the at least one protrusion member enters the housing, and switches to the second state,
the at least one protrusion member includes:
a main body portion, wherein the main body portion contacts the measurement target in both the first state and the second state;
an arm portion that extends in an apparatus inside direction from the main body portion; and
a hook provided at a tip of the arm portion, wherein as the hook is hooked on a regulating portion provided in the housing, a protrusion amount of the at least one protrusion member from the bottom surface is regulated; and
at least one pressing member that presses the at least one protrusion member in a protruding direction from the bottom surface of the housing.

7. The color measuring apparatus according to claim 6, wherein
a plurality of protrusion members are provided at four corners of the bottom surface, and
the plurality of protrusion members includes the at least one protrusion member.

8. The color measuring apparatus according to claim 6, wherein in the first state of the at least one protrusion member, the arm portion protrudes from the bottom surface and is configured to be elastically deformed in a direction intersecting with a displacement direction of the at least one protrusion member.

9. The color measuring apparatus according to claim 6, wherein the at least one protrusion member is provided with a roller configured to perform driven rotation at a position in contact with the measurement target.

10. The color measuring apparatus according to claim 6, wherein a friction coefficient between a part of the at least one protrusion member that contacts the measurement target and the measurement target is higher than a friction coefficient between the bottom surface and the measurement target.

\* \* \* \* \*